United States Patent
Rohatschek et al.

(10) Patent No.: US 9,065,732 B2
(45) Date of Patent: Jun. 23, 2015

(54) COMMUNICATION CONFIGURATION AND METHOD FOR DEBUGGING, RESPECTIVELY FOR PROGRAMMING ONE OR MORE PARTICIPANTS OF THE COMMUNICATION CONFIGURATION

(71) Applicants: Andreas-Juergen Rohatschek, Wernau/Neckar (DE); Dieter Thoss, Schwieberdingen (DE); Thorsten Huck, Freiberg (DE); Daniel Drescher, Oberriexingen (DE); Michael Frischke, Hemmingen (DE); Stoyan Todorov, Mannheim (DE)

(72) Inventors: Andreas-Juergen Rohatschek, Wernau/Neckar (DE); Dieter Thoss, Schwieberdingen (DE); Thorsten Huck, Freiberg (DE); Daniel Drescher, Oberriexingen (DE); Michael Frischke, Hemmingen (DE); Stoyan Todorov, Mannheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 134 days.

(21) Appl. No.: 13/849,861

(22) Filed: Mar. 25, 2013

(65) Prior Publication Data
US 2013/0258906 A1    Oct. 3, 2013

(30) Foreign Application Priority Data

Mar. 29, 2012    (DE) .......................... 10 2012 205 163

(51) Int. Cl.
G01R 31/08    (2006.01)
H04L 12/24    (2006.01)
H04L 12/26    (2006.01)
H04L 12/42    (2006.01)
H04L 12/437    (2006.01)

(52) U.S. Cl.
CPC ............ *H04L 41/0803* (2013.01); *H04L 43/50* (2013.01); *H04L 12/42* (2013.01); *H04L 12/437* (2013.01)

(58) Field of Classification Search
None
See application file for complete search history.

(56) References Cited

U.S. PATENT DOCUMENTS

| | | | |
|---|---|---|---|
| 7,036,042 B1* | 4/2006 | Nguyen | 714/4.2 |
| 7,185,857 B2* | 3/2007 | Potter et al. | 244/169 |
| 7,265,578 B1 | 9/2007 | Tang et al. | |
| 7,554,357 B2 | 6/2009 | Chen et al. | |
| 8,179,787 B2* | 5/2012 | Knapp | 370/222 |

FOREIGN PATENT DOCUMENTS

DE    10 2010 041 427    3/2012

* cited by examiner

*Primary Examiner* — Duc C Ho
(74) *Attorney, Agent, or Firm* — Kenyon & Kenyon LLP (57) ABSTRACT

A communication system configuration has an annular design and includes multiple participants which are serially interconnected, one participant being configured as a master and the remaining participants being configured as slaves. The master is configured for transmitting a data packet to one or a plurality of slaves, and each slave has a shift register. The communication system includes a participant which has an external interface and is adapted for receiving data via the external interface from outside of the communication system to implement a debugging or a programming of one or a plurality of participants of the communication system or for transmitting data to outside of the communication system.

13 Claims, 4 Drawing Sheets

COMMUNICATION CONFIGURATION AND METHOD FOR DEBUGGING, RESPECTIVELY FOR PROGRAMMING ONE OR MORE PARTICIPANTS OF THE COMMUNICATION CONFIGURATION

BACKGROUND OF THE INVENTION

1. Field of the Invention

The present invention relates to a communication configuration for debugging, respectively for programming one or more participants of the communication configuration, as well as to a corresponding method.

2. Description of the Related Art

Many networks employ serial interfaces instead of parallel interfaces. This is done to reduce the costs of assembly and connection technology, for example, the number of pins, to simplify the system design, and to provide bandwidth scalability of transmission data through the parallel use of a plurality of serial interfaces.

This trend is manifested in the field of consumer electronics, in particular, by a multitude of serial interface standards. These are mostly used for communicating with peripheral devices, such as hard disks or displays. However, apart from the small number of pins, these interfaces use complex protocols that require a significant outlay for implementation. Today's interfaces require several data streams, such as PCI Express or QuickPath, and thereby provide a bandwidth scalability for the system designer to transmit data among logic modules (ICs), for example, on the main board of a PC or within a handheld device.

In the field of automotive technology, serial interfaces (SPI, serial peripheral interfaces) are used for transmitting data among logic modules that are configurable as integrated circuits (IC, integrated circuits) in control units. This standard describes a bidirectional, synchronous and serial data transmission between a module configured as a master and various modules configured as slaves. An interface includes at least three lines between the master and a slave. These are typically two data lines and one clock line. If there are a plurality of slaves, each of these modules requires an additional select line from the master. The SPI interface makes it possible to implement a daisy-chain or bus topology.

In some cases, the SPI interface is not suited for transmitting the time-critical drive signals that are needed to meet the real-time requirements of today's safety-critical applications, such as ESP. Often, the use of an SPI interface merely entails exchanging diagnostic and status information. Due to the use of timer units and/or proprietary interfaces, substantial outlay is generally required to transmit time-critical drive signals to the drive modules of the actuators and/or from the evaluation circuits of the sensors.

When the SPI interface is used in the form of a bus topology at higher data rates, poor EMC properties cause worsening signal integrities and significant interference. In addition, only the transmission signal is transmitted in synchronism with the clock signal, while, at high data rates, the phase-synchronous transmission of the received signal becomes increasingly more difficult due to the internal delay times in the slave. It can also cause errors in the data transmission.

Very long latency times arise when the SPI interface is used in a daisy-chain topology, i.e., ring topology, which is why this form cannot be efficiently used in motor vehicle control units.

Published German patent application document DE 10 2010 041 427 describes a communication configuration which has significant advantages over the known configurations. This communication configuration has an annular configuration (preferably a daisy-chain topology) and includes at least two participants that are serially interconnected (preferably via point-to-point connections). The participants include one master, as well as one or a plurality of slaves. Each of the slaves has a shift register, preferably a 1-bit shift register. This allows data to be transmitted via the communication configuration, thus over the ring, from participant to participant with a minimal delay of one bit.

Besides the interchip interfaces in question, the related art provides a separate interface (for example, JTAG) for the debugging and/or programming of the control units that is no longer accessible following shipment of the control units. However, it is also possible to program a new software or to read out measurement data from the control units via external communication interfaces (for example, CAN), however, using a limited bandwidth in comparison to a dedicated interface approach.

A method for an in-system programming using SPI and JTAG is known from U.S. Pat. No. 7,265,578 B1, for example. U.S. Pat. No. 7,554,357 B2 describes an efficient programming of participants of a daisy-chain configuration.

BRIEF SUMMARY OF THE INVENTION

The present invention is directed to a communication configuration which is mainly ring-shaped (preferably a daisy-chain topology) and includes at least two participants that are serially interconnected (preferably via point-to-point connections). In this context, one participant is preferably configured as a master and the remaining participants as slaves. Microcontrollers, logic modules and FPGAs are conceivable as masters, in particular. Slaves may preferably be configured as functional ASICs (for example, output stages). In addition, the master is configured for transmitting a data packet to one or a plurality of slaves, and each slave has a shift register via which the data packet is shifted. Such a configuration makes possible a type of transmission that only requires two pins/signals per participant and, additionally, the introduction of further modules in the transmission path. In accordance with the present invention, the communication device includes one participant that has an external interface and is adapted for receiving data via the external interface from outside of the communication configuration to implement a debugging or a programming of one or a plurality of participants of the communication configuration. In the same way, the participant may transmit data via the interface to the outside of the communication configuration to implement a debugging or a programming of one or a plurality of participants of the communication configuration. In this context, a debugging is a process which involves diagnosing, respectively discovering errors of the participant(s), respectively of the entire communication configuration, in particular diagnosing the communication within the configuration. The debugging may include diagnosing the software and/or the hardware components of the participants, respectively of the communication configuration.

The present invention is also directed to a method in which, for the debugging, respectively programming of one or a plurality of modules, a plurality of participants may be configured in an annular communication configuration and be serially interconnected. One participant is preferably adapted as a master, and the remaining participants as slaves. The master transmits data packets to one or a plurality of the slaves, the data packets in the slaves propagating through via a shift register. One participant of the configuration transmits or receives data via an external interface to, respectively from the outside of the communication configuration to implement a debugging or a programming of one or a plurality of participants of the communication configuration.

Many advantages over known configurations are derived from such a communication configuration, respectively from the debugging or programming processes carried out in such a communication configuration. For example, the configuration features a very small number of lines, which may lead to a significant reduction in outlay and cost, particularly in the context of more complex systems, since each further module in the configuration only necessitates one more line. The embodiment provided here of a debug/programming interface, respectively the method implemented in the communication configuration provided here allows an external intervention into the control unit-internal communication. Thus, new data may be input into the system, or, however, the control unit-internal, transmitted data may be modified and/or read out.

An especially flexible system is obtained when the participant, which constitutes the debug, respectively programming interface, may be separated from the communication configuration in accordance with the corresponding debug, respectively programming processes. This may be accomplished, for example, in that the system, respectively the configuration or the participant features a bypass which makes it possible for the communication to bypass the interface module. The advantage of this measure is that it allows the interface participant to again be integrated at any time in the communication configuration by deactivation of the bypass mode. Alternatively, it may also be basically provided that the interface participant remain only temporarily in the system. This may be accomplished, for example, by integrating the participant in the system only for the debug, respectively programming processes, for example, via contact needles. This enables it to be very readily removed again and advantageously used for other systems in a flexible manner. Following removal of the participant, the data ring of the communication configuration must be closed again. The advantage of such a flexible system is that, once the participant has fulfilled its task, it does not adversely affect the communication in the configuration.

It is especially advantageous for the external interface to be configured as a radio interface, since an intervention into the internal communication of the communication configuration from the outside is readily possible.

The present invention may be used, in particular, in electronic control units, for example, in motor vehicles. In this context, the communication configuration, respectively the participants thereof, fulfills a functionality of the control unit.

DETAILED DESCRIPTION OF THE INVENTION

The basic serial, as well as ring-shaped communication configuration shall be described first. At least one slave, in particular a discrete logic module (ASIC), as well as a master, in particular a logic module, such as a microcontroller, are provided as participants of the configuration for controlling and/or regulating the at least one slave. A simple and cost-effective implementation on logic modules, i.e., microcontrollers and/or ASICs, is rendered possible at high data rates, it be possible to realize an implementation of this kind using few connection lines on a circuit board and a few pins of the logic module, i.e., at low cost for the assembly and connection technology.

The participants are configured in the communication configuration in the form of a ring topology, making it possible for the participants to be connected via point-to-point connections to a minimal number of pins. In the ring topology, the slowest participant determines the bus speed. In some instances, participants may be clustered or grouped in different rings; in each of these rings, a specific embodiment of the method according to the present invention being able to be implemented for one complete specific embodiment of a communication configuration according to the present invention. If a plurality of functional groups are integrated in one control unit, respectively if a microcontroller communicates with at least one ASIC of different functional units, then the functional groups in question typically each use a separate ring configuration.

A microcontroller typically acts as a master, whereby no bus arbitration is necessary. Thus, in accordance with today's SPI protocol, the master, which is likewise a master-slave concept, may cyclically query the slaves by what is generally known as polling.

A synchronous data transmission may be carried out in accordance with the SPI standard. However, no separate lines for data or clock pulse are needed. The interface provides for an encoded transmission of the clock pulse within the data signal, for example an 8B/10B encoding, Manchester encoding or Miller encoding, respectively modified frequency modulation. Consequently, for low data rates, only two pins per participant are provided with one line each to the preceding and subsequent participant. For high data rates, a differential transmission is envisaged where four pins are used per participant, each having two lines to the preceding and subsequent participant. Besides reducing costs, the encoded transmission of the clock pulse information also makes it possible to avoid any delays between the clock pulse and the data on a transmission link between the participants. A system clock is predefined by the master, and all slaves are synchronized by dedicated, local clock recovery modules, for example, by a phase control loop or by an oversampling including corresponding synchronization to the message signal.

During initialization at the beginning of a transmission, the master transmits a synchronization signal, for example, the intermediate frame symbol from a first interface, from where data packets are sent, to the first slave in the communication configuration formed as a ring. As soon as the system clock of the first slave, i.e., receiver, is in phase with the master, the further routing of the synchronization signal to the next slave begins. This procedure continues through the entire communication configuration. Once all of the slaves in the communication configuration formed, for example, as a ring have been synchronized, a receiver in the master, normally a second interface provided for receiving data packets, may also be adapted. Due to the unknown delay in the master in the transmission of data frames or empty frames through the ring and the associated phase offset to the internal system clock, a phase tracking is also undertaken in the master in a last step of the initialization. Once the phase is also corrected in the receiver of the master, all participants are in phase and may, at this point, transmit data packets synchronously.

To avoid frequency fluctuations of the clock recovery modules in the slaves caused by constant re-synchronization, a continuous transmission of data and thus of data packets may be used during what is generally referred to as continuous operation. In the first place, this eliminates the overlap of synchronization patterns at the beginning of a data packet which, in contrast to the continuous transmission (generally referred to as continuous transmission mode), is required in a packet-oriented transmission (generally referred to as burst transmission mode). The possibility of continuous synchronization obviates the need for any further system clock for the slaves which, in known systems, must normally be additionally provided in addition to the communication interface. This eliminates the need for further lines and pins. The continuous operation optionally provides for the use of a spread-spectrum method, respectively a spread spectrum for improving the EMC properties. The use of a packet-oriented transmission (generally referred to as burst transmission mode) is also possible, even though this would possibly necessitate an additional line for transmitting the system clock from the master to the slaves.

In a further embodiment, the participants participating in the communication have shift registers. The shift registers are automatically clocked, a clock pulse for the time base of the master, which is configured as a microcontroller, being recovered by a clock recovery module. The shift register automatically transfers the data in response to a clock signal of this clock pulse. Since the bits may be individually processed, the minimal latency time of one bit duration per participant may be achieved. Thus, latency times which result until a data packet having one message is transmitted through the ring, are short, whereby the real-time capability of the communication configuration may be ensured. In addition, in response to the minimal delay of the message by at least one clock pulse, a signal conditioning is carried out in each participant, i.e., what is generally referred to as a bit reshaping, that may be effected in a level- and/or time-related process.

The addressing of the participants in the communication configuration is preferably not carried out via a separate selection signal, rather by an addressing within a data packet configured as a data frame or empty frame. To detect the address field in the continuous data stream, the intermediate frame symbol, which, in the embodiment, corresponds to an initial symbol, as well as to an end symbol of a data packet, is inserted.

The intermediate frame symbol may also be considered as a preamble of a data frame, whereby the slaves may synchronized to the pending data. The frame is synchronized in this manner since each participant knows that the data are always transmitted following the intermediate frame symbol. The intermediate frame symbol may also be used for implementing variable data lengths.

The master may address the slaves via the addressing and write or read data using appropriate commands.

The described interface may be used to switch among various frame lengths. If a fixed frame length is selected, small data packets may be transmitted within one large frame under certain circumstances. This requires filling the data frame with dummy data. A variable frame length may likewise be implemented, it being possible for the length of the data registers in the slaves to be mutually independent since the irrelevant data frames are only passed through in each instance.

In the case of variable frame lengths, the slaves may signal a request to the master via an empty frame that useful data be transmitted by the slave, after which these useful data are subsequently retrieved by the master by the sending of a data frame of appropriate length.

A slave obtains its address in accordance with the position in the ring via the empty frame. The empty frame is sent by the master with address value 0x00, each slave increasing the address value by value 0x01 and storing the received value in its address register. Thus, at the time an empty frame is sent, an address is indirectly allocated. In accordance with the position in the ring, the slave may modify the interrupt bit assigned thereto in the empty frame and thus transmit an interrupt query to the master.

The slave may transmit an interrupt, for example a soft interrupt, via an empty frame, to the master and wait for the master to send an appropriate data frame to the slave in a next cycle. This data frame is provided with a set reservation flag and the address of the slave. At this point, for example, the command for reading out a register may again reside in the content of the data frame, in accordance with which, the slave subsequently copies the existing information into the data frame.

To trigger a signalization in this variant of the communication, a slave is prioritized on the basis of the position of the slave in the communication configuration. In one embodiment of the interface, a slave may transmit a signalization to the master by the setting of a bit assigned thereto. Following the intermediate frame symbol and the reservation flag, a number of bits follows in accordance with the number of slaves as participants in the communication configuration that is at least as great as the number of participants, typically the number of slaves in the communication configuration that may trigger an interrupt. Accordingly, participants, which only receive data from the master and do not deliver any messages thereto, do not have any interrupt capability and consequently ignore the empty frames. Thus, for these types of participants, there is also no need for any interrupt bit to be reserved in the empty frame. To the extent that an interrupt is to be triggered by an interrupt-capable participant, this participant sets the bit assigned thereto. At this point, the processing of the interrupts may be prioritized in the master (microcontroller).

An error correction may likewise be added in another embodiment. If a communication configuration is to have an annular form, then, due to the ring topology, the design may be such that, following transmission through the ring, the master compares the received message to the message it originally sent, making it possible to infer an error-free or faulty transmission. The response to a query from the slaves is generally sent directly to the master to ensure a better utilization of the system. Alternatively, the slave's response may also first follow at the time of the subsequent data packet addressed thereto, in accordance with present-day embodiments of an SPI communication. A cyclic redundancy check (CRC) may be optionally implemented as a check sum method, or a parity check may be added within the data frame, and the receiving participant may acknowledge a reception at the end of the response thereof (acknowledge).

The data may be optionally transmitted by again decoding a message using data that are usually provided within a data frame and that are completely transmitted through the ring, starting from the transmitter, i.e., the master, prior to the transmission of the next data frame. Alternatively, a continuous bit stream of data may also be selected, i.e., the transmission of the next data frame follows immediately afterwards and not first following reception of the previous message. In this case, it is ensured in the protocol by arbitration that a soft interrupt of a slave is correctly processed in the case of overlapping addressing by the master; i.e., the master addresses the slave even before the soft interrupt of the slave is processed. This scenario is permissible and does not influence the embodiment of the described bit transmission layer.

An implementation of an additional logic module follows optionally in the master in order to write the received data, for example, sensor data, directly into a memory. In addition, the polling of the slaves may be automated. In response thereto, the software interaction is reduced, thereby relieving the central processing unit (CPU). In addition, the registers of the ASICs (slaves) may be stored transparently in the memory of the microcontroller (master). Possible HW modules are known from the related art as DMA, transfer units, or also as message boxes.

An interface provided within the scope of the present invention for a participant may be used for applications in the automotive sector. In accordance with the known standards, such as IIC (inter-integrated circuit) and SPI (serial peripheral interface), the known interface may likewise be universally used and, accordingly, not limited to a use in the automotive sector or even in control units (ECUs).

The communication configuration according to the present invention is designed for implementing all steps of the presented method. Individual steps of this method may also be performed by individual components, typically the participants of the communication configuration. In addition, functions of the communication configuration or functions of individual components of the communication configuration may be implemented as steps of the method. Moreover, it is possible for steps of the method to be realized as functions of at least one component of the communication configuration or of the entire communication configuration.

A serial type of transmission is selected for debugging and programming processes of participants of a communication configuration. In particular, the described communication configuration, respectively the thereby devised debug, respectively programming interface for applications in the motor vehicle sector, in particular in electronic control units (ECUs) of a motor vehicle, may be used. In the case of the participants of the communication configuration, it may, in particular, be a question in the various specific embodiments of participants that are installed on the circuit board of a control unit. However, the use is not limited to the automotive sector or even to ECUs. Rather, universal use is possible in a broad array of applications.

The participants (also referred to as nodes) are configured in the form of a ring topology, making it possible for the participants to be connected by point-to-point connections. A participant acts as a master, whereby no bus arbitration is necessary. The communication participants advantageously have a shift register. The shift registers are subsequently automatically clocked using the clock pulse recovered from the clock recovery module as a time base for the master, respectively microcontroller. The shift register automatically transfers the data in response to this clock signal. Since the bits are individually processed, the delay of one bit duration and thus minimal latency suffices. In addition, a signal conditioning (generally referred to as bit reshaping) is carried out in each participant in response to the minimal delay of the message by at least one clock pulse. In addition, each participant may modify the messages on the channel using the 1-bit delay.

The described ring-shaped communication system is expanded by a further participant, namely by a debug node, respectively debug participant, which is inserted into the ring. This debug node preferably does not include any component of the main functionality of the communication configuration. For example, if this main functionality includes a control unit functionality (for example, ABS/ESP control), then the debug node preferably does not contribute hereto. Rather, this participant represents an interface to external systems. In this case, "external" denotes a position outside of the communication configuration. Via this debug participant, an external system may intervene in the internal communication of the communication configuration, thus, for example, in the communication internal to the control units. The external system may inject data, for example in order to provide new software and/or hardware configurations (when using programmable implementation platforms). Moreover, the data transmission that is internal to the communication configuration (respectively internal to the control units) may be monitored in a debug mode.

The debug node has a 1-bit shift register. Moreover, as described above with reference to the ring-shaped serial communication system, the data that propagate through this shift register may be modified. For example, data may also be manipulated for test purposes. Due to the slight delay of one bit, the communication in the control unit is not further influenced, i.e., the latency may be disregarded. Thus, from the functional software perspective, the debug node is "invisible." Thus, no adaptations in the software of the communication configuration, respectively in the participants thereof are necessary.

Figure 1:
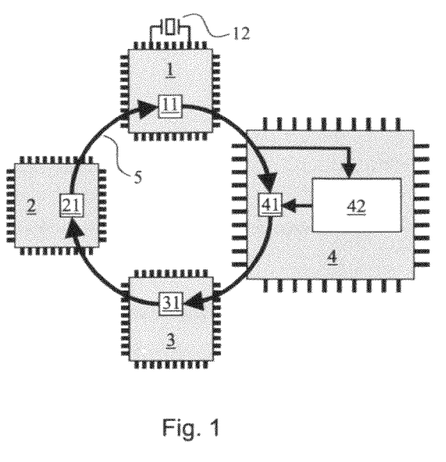
FIG. 1 shows a ring-shaped, serial communication configuration.

FIG. 1 shows a corresponding ring-shaped communication configuration in a simple embodiment. It features a master 1, as well as slaves 2-4. Master 1 has a register 11, as well as a clock generator means 12. Slaves 2, 3, 4 have shift registers 21, 31, respectively 41. Indicated representatively also for remaining slaves 2 and 3, in particular for slave 4 that is shown in greater detail, is, in addition, clock recovery means 42 which enables a clock pulse of clock generator means 12 of master 1 to be recovered. A data stream 5, which includes data packets that are transmitted in the communication configuration, is represented by arrows. As indicated in FIG. 1, the data stream propagates in slaves 2, 3, 4 via shift registers 21, 31, 41. The shift register in question here is preferably a 1-bit shift register, so that a very slight delay of one bit results for data stream 5 in each instance.

Figure 2:
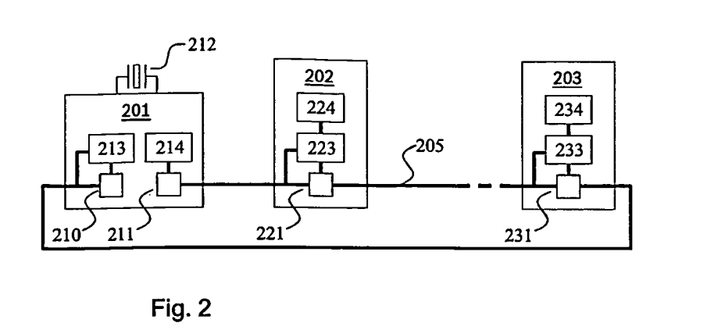
FIG. 2 shows the ring-shaped, serial communication configuration in another representation.

FIG. 2 shows a corresponding data ring in another representation. The illustrated detail of the ring-shaped communication configuration includes a master participant 201 having clock generator means 212, clock recovery means 213, a system clock 214, as well as registers 210 and 211, and two slave participants 202 and 203, each having a shift register 221, respectively 231, having clock recovery means 223, respectively 233, as well as a system clock 224, respectively 234. Communications link, respectively line 205 of the communication configuration interconnects illustrated participants 201-203, and optionally other participants (not shown) as well, in an annular form.

Figure 3:
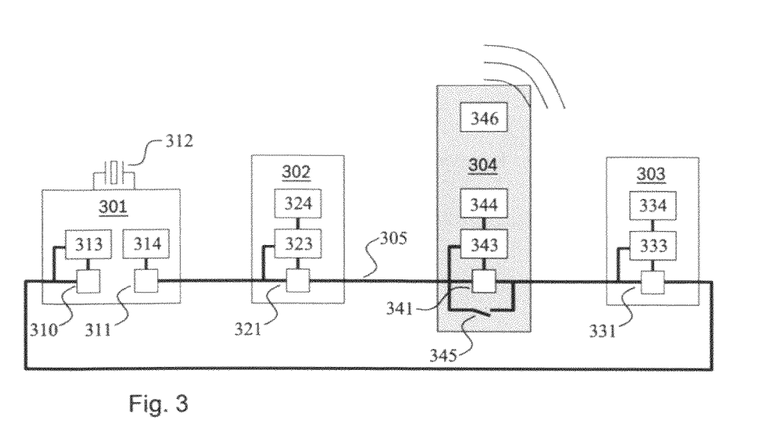
FIG. 3 shows a communication configuration that is suited for debugging or programming one or a plurality of participants and that includes a debug or programming node.

In accordance with FIG. 2, FIG. 3 shows a master participant 301 having clock generator means 312, clock recovery means 313, a system clock 314, as well as registers 310 and 311, and two slave participants 302 and 303, each having a shift register 321, respectively 331, having clock recovery means 323, respectively 333, as well as a system clock 324, respectively 334. In addition, a further participant 304 is configured in the communication configuration. This is a debug or programming node, respectively participant. Besides a shift register 341, this includes clock recovery means 343 and a system clock 344, an interface 346 to the outside (thus, to the outside of the communication configuration). In the special embodiment according to FIG. 3, this interface 346 is provided as a wireless communication interface (wifi interface) (indicated by the transmission waves).

Communications link, respectively line 305 of the communication system interconnects all of the illustrated participants 301-304 in an annular form. However, in further exemplary embodiments, external interface 346 of participant 304 may likewise be differently configured, in particular be connected by wire, optically etc. Via external interface 346, participant 304 receives data from the outside, respectively may transmit data to the outside. On the basis of this communication to the outside, program components of participants of the communication configuration may be changed, as well as monitoring and diagnostic functions implemented. Thus, participant 34 functions as a debug, respectively programming interface of the communication configuration. Via such an interface 304, a new software may be loaded into the system, for example, into a control unit in a workshop. To the extent that debug participant 304 remains in the system, in particular on the circuit board of a control unit, and is no longer used in the field, it may be provided that the participant changes to a bypass mode following a completed programming and is thus no longer a functional part of the communication configuration in the field in the further operation. For later programming processes, the bypass mode may be ended again. In FIG. 3, the bypass mode is represented by a preferred hardware bypass 345. A direct connection of participants 302 and 303 via connection 305 is rendered possible therethrough without the communication between these participants propagating through participant 304. Thus, the debug node may remain in the system following a test, debug or programming process, respectively remain on the circuit board without influencing the later communication in the data ring.

Figure 4:
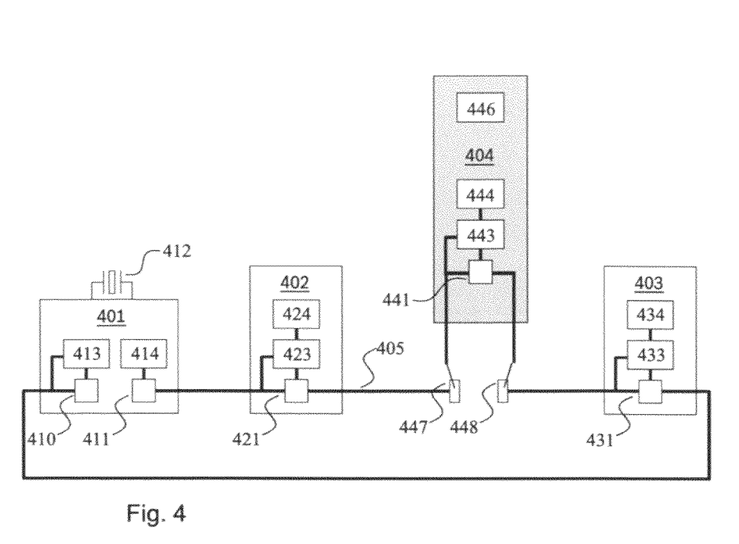
FIG. 4 shows a communication configuration that is suited for debugging or programming one or a plurality of participants and that includes a debug or programming node that is flexibly separable from the system.

Alternatively, the debug node may also be removed from the system, respectively from the circuit board following a test, debug or programming process. This is shown in FIG. 4. Shown in turn in FIG. 4 is a master participant 401 having clock generator means 412, clock recovery means 413, a system clock 414, as well as registers 410 and 411, and two slave participants 402 and 403, each having a shift register 421, respectively 431, having clock recovery means 423, respectively 433, as well as a system clock 424, respectively 434. Configured additionally, in turn, is a further debug, respectively programming node, respectively participant 404 in the communication configuration. Besides a shift register 441, this includes clock recovery means 443 and a system clock 444, a system interface 446 to the outside (thus, to the outside of the communication configuration). The communications link, respectively line 405 of the communication configuration interconnects all illustrated participants 401-404 in an annular form. The functioning method of interface 446, respectively of participant 404 corresponds to those of interface 346, respectively of participant 304, as described in connection with FIG. 3. However, in the specific embodiment shown in FIG. 4, debug node 404 is only used intermittently in the system, for example for test purposes in the factory. To this end, the participant, respectively debug node 404 may be connected via contact needles, for example, to communication line 405 and thus to the communication configuration (connection points 447, 448). Following completion of the test, debug or programming processes, the ring may be closed again, for example, by the provision of an OR resistor. Thus, the debug node may be flexibly introduced into the communication configuration, respectively removed again therefrom. It may be used, for example, following a test, debug or programming process of a control unit in the factory to remove participant 404 prior to the shipment, respectively packing of the control unit.

In another specific embodiment, the debug node, in the form of a multi-slave, may be combined with further participants.

Thus, the debug node is located on a physical implementation platform (ASIC, FPGA, . . . ) together with other non-debug nodes. The debug node is preferably integrated in the system ASIC. The system ASIC is a central module of the communication configuration, for example a component in a control unit that has a voltage supply and interfaces to further communication configurations (for example, to a CAN bus).

In all specific embodiments, upon activation, respectively insertion of the debug node, it may assume the master functionality in the communication configuration, and the actual, respectively previous master of the system (for example, the microcontroller) becomes a slave. The change in the functionality of the microcontroller from master to slave may take place, in particular, via a signal line and/or external circuit elements and corresponding initialization during the ramp-up phase. Following deactivation, respectively removal of the debug node, the actual, respectively original master node then assumes the master function of the communication configuration.

What is claimed is:

1. A communication system which has an annular configuration, comprising:
multiple participants which are serially interconnected, one participant being configured as a master and the remaining participants being configured as slaves, wherein each slave has a shift register;
wherein:
a first participant has an external interface and is adapted for (i) receiving data via the external interface from outside of the communication system to implement one of a debugging or a programming of at least one participant of the communication system, or (ii) transmitting data to outside of the communication system;
the first participant is periodically activated to receive or transmit data via the external interface;
the first participant is the master when the first participant is activated; and
one of the remaining participants is the master when the first participant is deactivated.

2. The communication system as recited in claim 1, further comprising:
a bypass to enable the first participant to be selectively separated from the communication system.

3. The communication system as recited in claim 2, wherein the first participant and further participants of the communication system are configured together in a circuit.

4. The communication system as recited in claim 2, wherein the communication system is configured to perform a functionality in a control unit.

5. The communication system as recited in claim 2, wherein the first participant is configured as part of a module which includes a voltage supply and at least one further interface to another communication system.

6. The communication system as recited in claim 2, wherein the external interface is configured as a radio interface.

7. A method for one of debugging or programming at least one participant of a communication system having multiple participants which are annularly disposed and are serially interconnected, one participant assuming a master status and the remaining participants assuming a slave status, the method comprising:

transmitting, by the master, data packets to at least one of the slaves, wherein data packets in the slaves propagate through via a shift register;

(i) receiving, by a first participant, data via an external interface of the first participant from outside of the communication configuration for the one of debugging or programming of the at least one participant of the communication configuration, or (ii) transmitting, by the first participant, data to outside of the communication configuration via the external interface of the first participant;

periodically activating the first participant to receive or transmit data via the external interface;

setting the first participant to be the master when the first participant is activated; and selecting one of the remaining participants to be the master when the first participant is deactivated.

8. The method as recited in claim 7, wherein the first participant assumes the master status of the communication system following insertion of the first participant into the communication system and subsequent activation of the first participant in the communication system.

9. The method as recited in claim 8, wherein the first participant is selectively separated from the communication system following one of a test, programming or debug phase.

10. The method as recited in claim 9, wherein the separation is accomplished by a bypass of the communication configuration.

11. The method as recited in claim 9, wherein the separation is accomplished by a complete removal of the first participant from the communication configuration and a subsequent closing of the communication configuration.

12. The method as recited in claim 9, wherein subsequent to the separation of the first participant from the communication system, the master status is assumed by another participant of the communication system.

13. A communication system which has an annular configuration, comprising:

multiple participants which are serially interconnected, one participant being configured as a master and the remaining participants being configured as slaves, wherein each slave has a shift register;

wherein:

a first participant includes an external interface and is adapted for (i) receiving data via the external interface from outside of the communication system to implement one of a debugging or a programming of at least one participant of the communication system, or (ii) transmitting data to outside of the communication system;

the first participant is periodically activated to receive or transmit data via the external interface;

the first participant is the master when the first participant is activated; and one of the remaining participants is the master when the first participant is deactivated.

* * * * *